United States Patent

Katagi

[15] 3,643,220

[45] Feb. 15, 1972

[54] SYNCHRONIZATION OF SERIAL MEMORY

[72] Inventor: Kazuo Katagi, Los Angeles, Calif.

[73] Assignee: RCA Corporation

[22] Filed: Mar. 26, 1970

[21] Appl. No.: 22,815

[52] U.S. Cl. ........ 340/172.5

[51] Int. Cl. ........ G06f 13/02

[58] Field of Search ........ 340/172.5

[56] References Cited

UNITED STATES PATENTS 2,961,535 11/1960 Lanning ........ 340/172.5 X 3,394,355 7/1968 Sliwkowski ........ 340/172.5

*Primary Examiner*—Raulfe B. Zache

*Attorney*—H. Christoffersen

[57] ABSTRACT

A delay line refresh memory stores the bits to be displayed on a visual display means such as a television receiver. A shift register in the feedback loop applies the stored bits back to the input circuit of the memory. Synchronization pulses which occur once each recirculation period are employed to determine which stage of the register to connect back to the memory, that is, to determine the amount of delay which must be inserted in the memory feedback loop to make the stored data synchronous with the synchronization pulses.

7 Claims, 5 Drawing Figures

Fig.1.

INVENTOR.
KAZUO KATAGI
BY
ATTORNEY

INVENTOR.
KAZUO KATAGI
BY
Attorney

INVENTOR.
KAZUO KATAGI
BY
Attorney

INVENTOR.
KAZUO KATAGI
BY
Attorney

INVENTOR.
KAZUO KATAGI
BY Samuel Cohen
ATTORNEY

SYNCHRONIZATION OF SERIAL MEMORY

BACKGROUND OF THE INVENTION

The problem dealt with in the present application is that of synchronizing information contained in a serial memory or group of serial memories such as delay line memories with some external time base. The memory may be the refresh memory of a video display means such as the kinescope of a television receiver. The display may be part of a computer system installation and may be displaying letters, numbers, symbols and so on. The delay line may be storing a sufficient number of characters, such as ASCII characters, to represent a complete "page" or field of displayed information. Each such character may contain several information bits and one parity bit and each character represents a letter, number or the like. The ASCII characters coming out of the delay line are applied to a character generator which converts the characters to video information. The video information is applied to intensity modulate the cathode-ray beam of the kinescope to cause it to display the successive characters of the page.

As the information comes out of the output end of the delay line it is passed through a feedback loop and applied back to the input end thereof. Suppose, for example, the delay line is storing one field of information. The delay inserted by the delay line (plus the delay of the feedback loop between the output and input ends of the delay line) must be precisely one field time and must occur in the proper phase relative to the frame synchronization signals (such as the vertical retrace signals) so that the information again can be applied at the proper time, via the character generator, to the kinescope to "refresh" the picture ("page" of information) being displayed.

The refresh information initially may come from some central source such as a computer which is time-shared by many different displays. The display deflection circuits may be synchronized from some separate source such as an ordinary 60-cycle power line or a television synchronization generator. Therefore, it is necessary, after the information is initially received from the delay line memory, to synchronize this information with the timing of the display deflection circuits to maintain the displayed picture stable.

The delay line memories ordinarily employed for refresh purposes are relatively inexpensive, they drift with temperature, and their actual delay may not exactly equal their nominal delay. For example, one commercially available 16-millisecond magnetostrictive delay line memory has an actual delay of 16 milliseconds plus or minus 10 microseconds or, in terms of bits, plus or minus 10 bits at a 1-megahertz bit rate. In the operation of such a memory, not only is it necessary effectively to adjust the delay line length to some precise value compatible with the field repetition period of the display being refreshed but also this effective length must continuously be monitored and adjusted to compensate for slow changes in operating parameters such as temperature.

One known method of maintaining the delay line in synchronization with the timing of a display means is to introduce a gap periodically in the data stream and to temporarily store for the necessary synchronization intervals the data located between the successive gaps. After each temporary storage interval (the gap interval) the data again is returned to the delay line. In one particular system, a block of 32 characters is shifted into a buffer register as the data bits emerge in serial fashion from the delay line memory. These 32 characters are held in the buffer for the required period to make them synchronous with the display and then the bits are shifted serially back into the delay line. A disadvantage of this method is that the time interval (gap) between each data block and the following data block is relatively large, larger than that actually needed by the possible variations in delay line length. In other words, an excessive amount of the memory space is employed for the gap rather than for data and a second disadvantage is that a relatively large shift register is required for the buffer register.

An object of the present invention is to provide a new and improved arrangement for synchronizing the data stored in a delay line memory with external timing signals.

SUMMARY OF THE INVENTION

The present invention includes a recirculating memory having an input circuit and an output circuit and which introduces a delay between said circuits which is nominally $T-\Delta t$. Sequential signals including a start signal are applied to said input circuit for storage in said memory. An adjustable delay circuit connects said output circuit to said input circuit for applying the signals stored in the memory back to said memory as they emerge therefrom. In response to a synchronization signal and said start signal, the delay introduced by the delay circuit is adjusted to a value such that the actual delay introduced by said memory plus the delay introduced by said delay circuit is equal to T, where T is the period of the synchronization signal.

DETAILED DESCRIPTION

Figure 1:
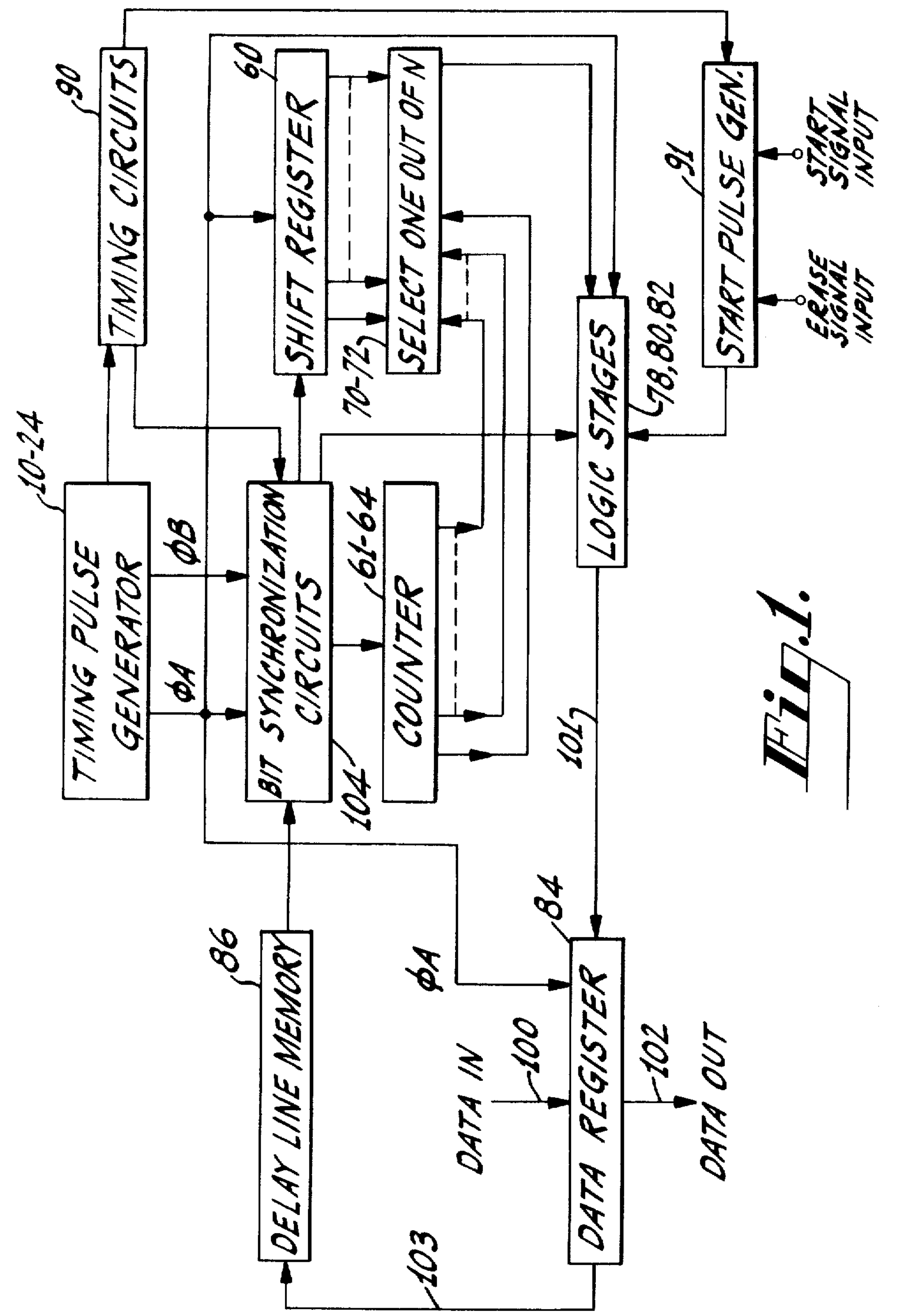
FIG. 1 is a block circuit diagram of a preferred embodiment of the present invention.

Referring first to FIG. 1, data register 84 supplies signals indicative of bits to the delay line memory 86. The first signal, hereafter known as a start signal, indicates the start of a group of sequential signals. In practice, this start signal always is positive, representing binary 1. As mentioned in the introductory portion of this application, the signals may represent ASCII characters which are translated by a character generator to the video signals for refreshing a kinescope. Neither the character generator nor kinescope are shown in FIG. 1, however, the character-holding register for the character generator may be connected to bus 102. In addition, the data register may include bus 100 to which bits, in parallel, may be applied and "strobed" into the register. (Note that in FIG. 1 a single lead such as 100 and 102 may represent multiple conductors or a single conductor as in the case of 103).

The data register 84 is a conventional parallel data input 100, output 102, register which is capable also of shifting bits serially therethrough (input lead and output leads for the serial bits 101 and 103, respectively). The number of stages in the register is normally equal to the number of bits in the word employed in the particular system and in the present example in which an ASCII code is employed, is eight, i.e., seven stages for information bits and one stage for a parity bit. Typical inputs to the register in the use of the system for display applications are keyboard data and computer messages. Typical outputs are messages to the processor and character codes to the character generator.

The serial bits passing through the delay line memory 86 are applied to the bit synchronization circuits 104. Among other things, their purpose is to make the signals produced by the delay line synchronous with the control pulses $\phi A$ and/or $\phi B$. How this is done is discussed in greater detail later in connection with FIG. 2.

The synchronous signals from circuits 104 are applied in serial fashion to shift register 60. A counter 61–64 keeps track of the stage in the shift register 60 in which the first signal applied to the shift register (the one derived from the start signal) is located. For example, shortly after this first signal is shifted into stage 1 of the shift register, a count of 1 registers in the counter 61–64. Shortly after the first signal reaches the second stage of the register 60, the count in the counter advances to 2 and so on.

It is desired that the first signal be applied to the character generator at a time which is a fixed time interval from an externally generated synchronization signal such as the vertical synchronization signal of a television synchronization generator. The timing circuits 90 produce synchronization signals once each display field which are synchronous with this time. In response to such a signal, the "select one out of N" circuit 70, 72 connects the stage of the register containing the start bit via the logic stages 78, 80, 82 to the data register 84. In response also to this signal, the counter 61–64 is stopped. Therefore, each following signal from the shift register is taken from this same stage in register 60 and applied back to the delay line memory.

The start pulse generator 91 performs a number of functions. In response to an erase signal input, it causes the logic stages 78, 80, 82 to open the feedback loop and in this way to erase the information stored in the memory 86. In response to a start signal, it permits the timing circuits 90 to insert the start bit into the loop; for example, via the data register 84, at an appropriate time such that it reaches approximately the center of the shift register 60 when the synchronization pulse occurs.

Summarizing the above, in the system embodying the present invention, there is a variable delay means, namely the shift register 60, inserted in the feedback loop of the delay line memory. The system measures the total delay inserted by the delay line memory and its feedback circuit, that is, the total time taken for a stored bit to traverse the entire memory loop, and compares this delay with the delay between successive synchronization signals. In response to any difference between these two intervals, the delay inserted by the shift register 60 is adjusted until the total delay introduced by the delay line memory and its feedback loop is exactly equal to that between a pair of succeeding synchronization signals (SYNC-P, FIG. 4) produced by the timing circuits 90.

Figure 2A:
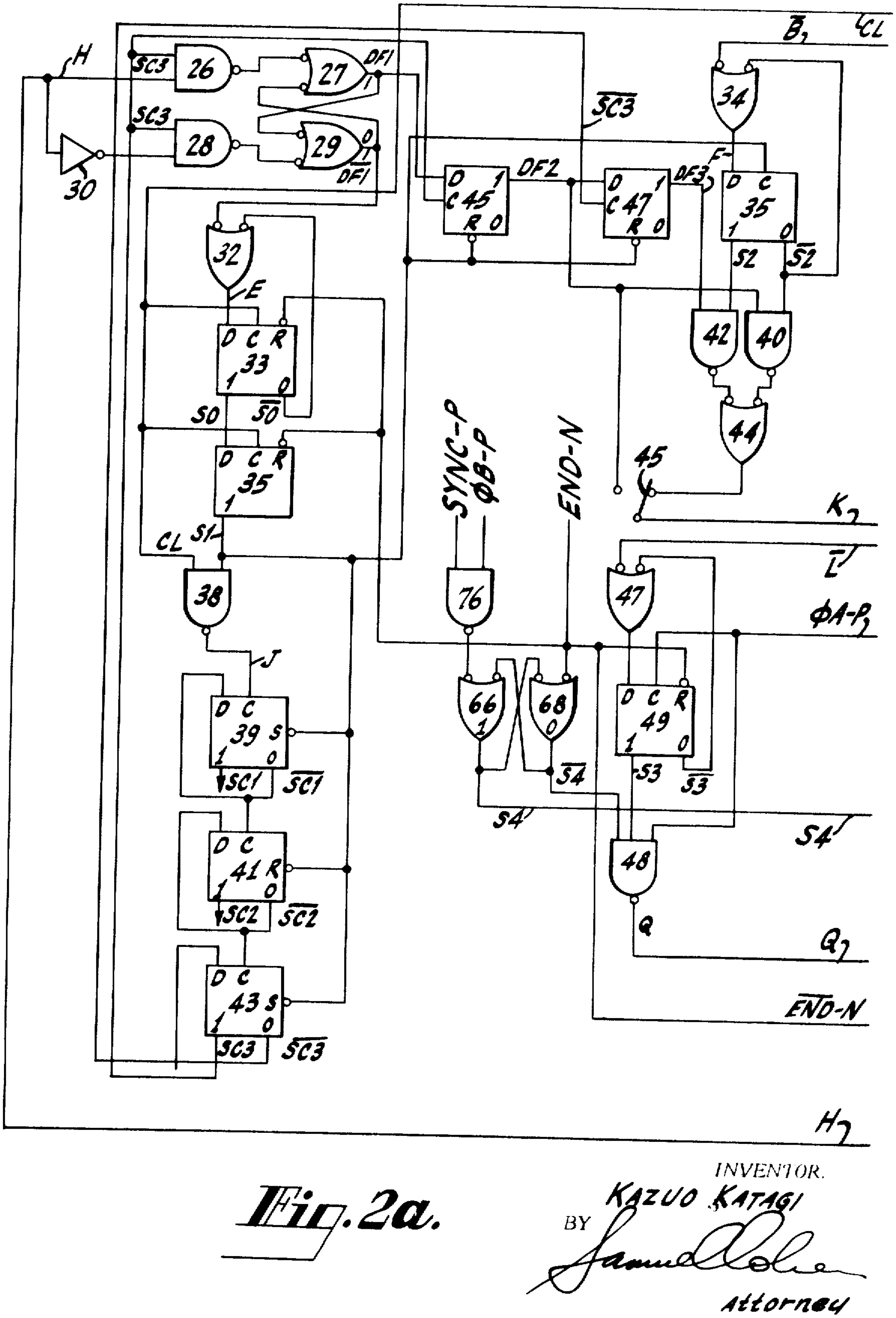
FIGS. 2*a* and 2*b* together comprise a more detailed block diagram of FIG. 1.
Figure 2B:
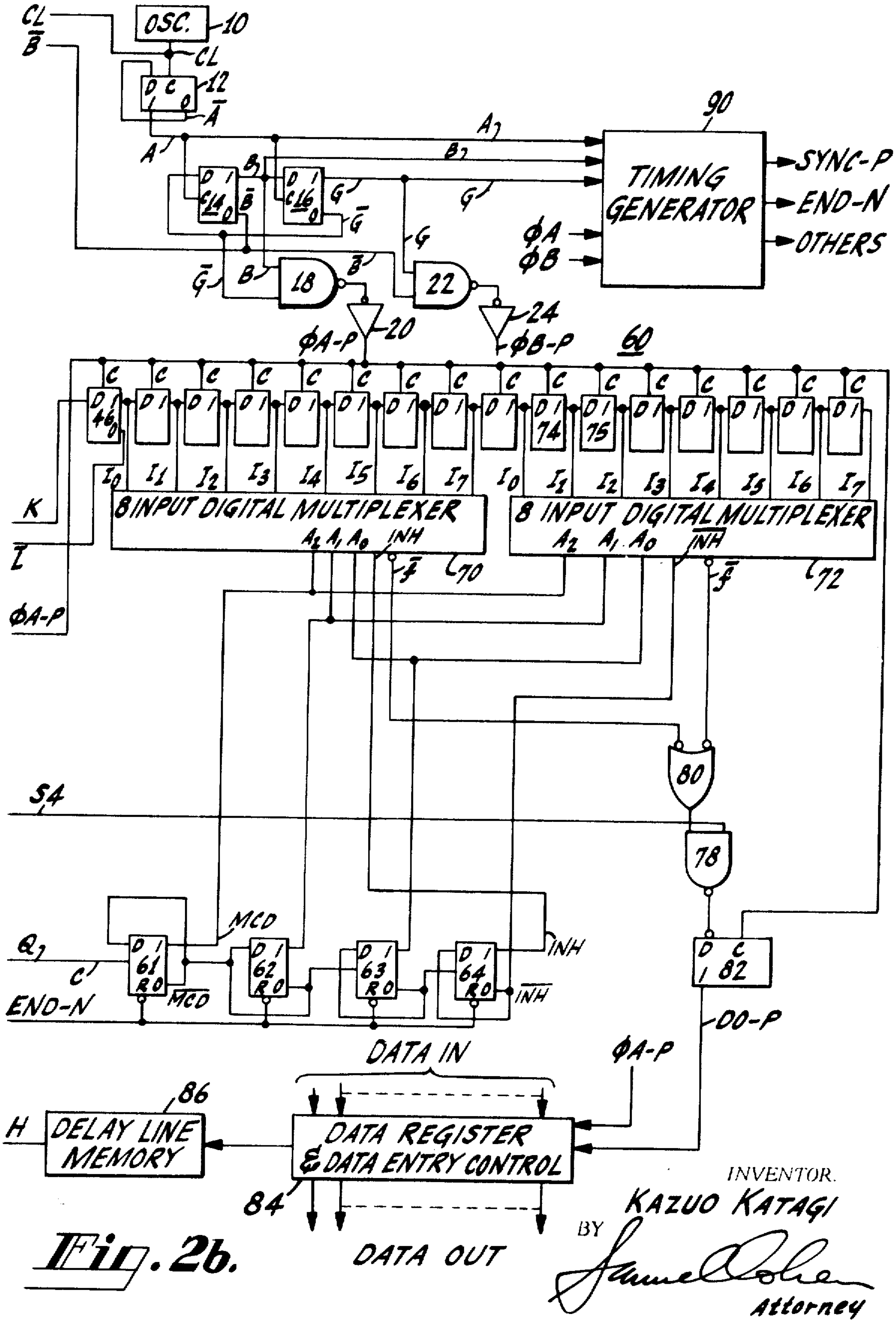

In the detailed discussion of FIG. 2 which follows, the following conventions are assumed. All of the logic gates perform the logical function of a NAND gate. In other words, in Boolean terms, each gate produces an output $Z=\overline{XY}=\overline{X}+\overline{Y}$. Where there is a circle present at an input or output terminal, it means that the so called "true" signal is negative and where there is no circle it means that the true signal is positive. To give some examples, for a gate such as 34 (FIG. 2*a*, upper right), when either input signal is negative, the output signal F is relatively positive and if both input signals are relatively positive the output signal F is relatively negative. For a gate such as 26, (FIG. 2*a*, upper left), if both H and SC3 are relatively positive, gate 26 produces an output which is relatively negative; if either H or SC3 is negative, gate 26 produces an output which is relatively positive.

The convention arbitrarily is adopted that a relatively positive signal represents binary 1 and a relatively negative signal, binary 0. In the explanation which follows, the bit itself rather than the signal representing the bit, may be referred to.

In some cases a signal is identified by a number of letters followed by an N or P. For example, END-N. The P means that the true signal is positive and the N means that the true signal is negative.

The logic elements represented by the rectangles are flip-flops. In operation, when the signal applied to the clock (C) terminal changes from 0 to 1, the signal present at the D-terminal is accepted and stored in the flip-flop. For example, if when C changes from 0 to 1, D=1, then the flip-flop becomes set and the signal present at the 1 output terminal (the unbarred terminal) represents a 1 and the signal present at the O-output terminal represents a 0. The reverse is the case when at the time C changes from 0 to 1, a 0 is present at the D-input terminal. When the signal applied to the C-terminal changes from 1 to 0 or does not change, there is no effect on the flip-flop.

The triangles such as 30, 20 and so on are inverters. The circuits represented by rectangles 70 and 72 are commercially available as Signetics Model No. 8230.

Figure 3:
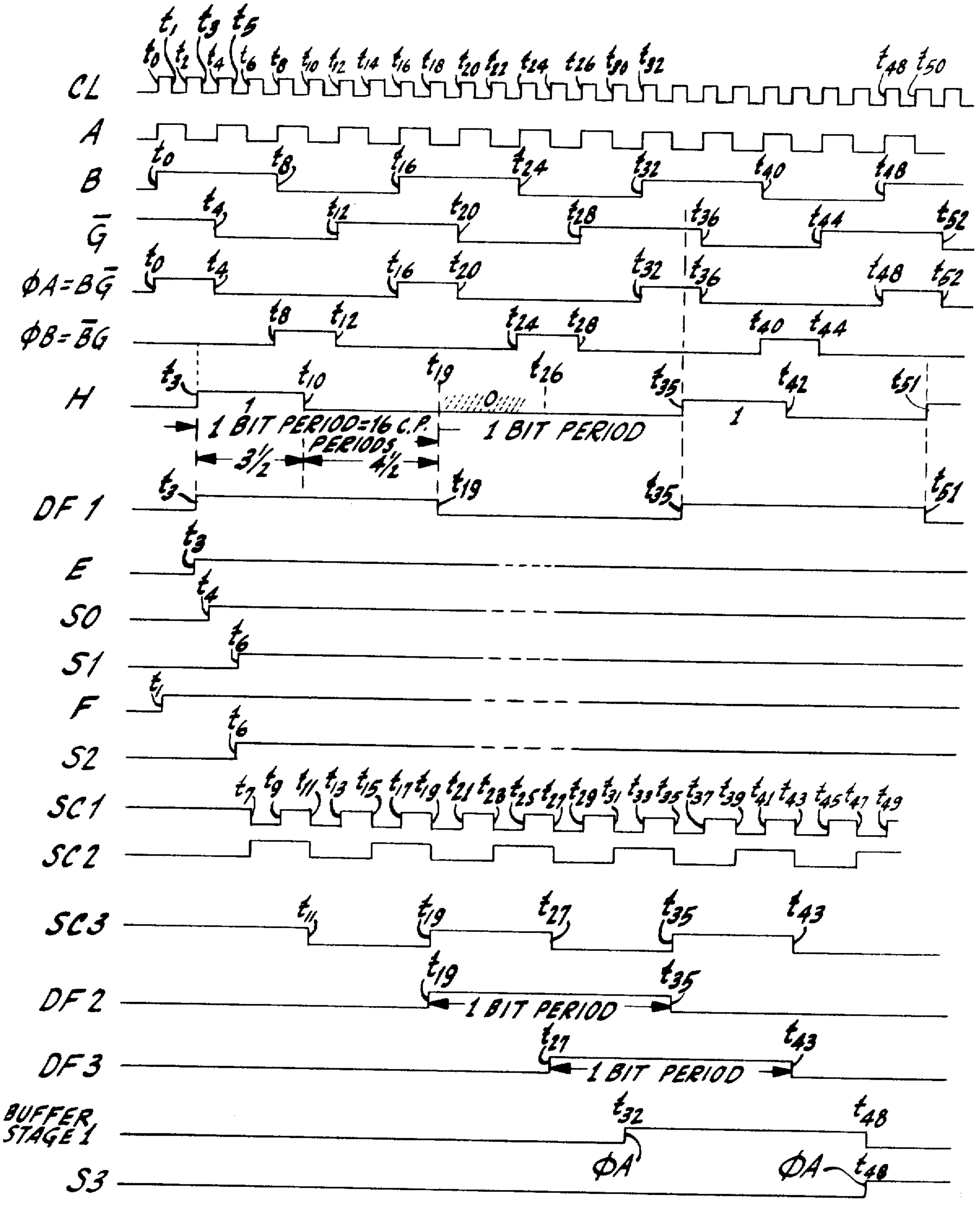
FIGS. 3 and 4 are waveforms to help explain the operation of the system of FIGS. 1 and 2.

In the discussion which follows, both FIGS. 2 and 3 should be referred to.

The oscillator 10 (FIG. 2*b*) produces clock pulses CL which change from 0 to 1 at even time intervals $t_0$, $t_2$, $t_4$ and so on and which change from 1 to 0 at odd time intervals $t_1$, $t_3$ an so on. These pulses are applied to the C-terminal of flip-flop 12. The O-output terminal of this flip-flop is connected back to its D-input terminal. If $\overline{A}$ initially is assumed to represent the value 1, then at $t_0$ $\overline{A}$ changes to 1 and A changes to 0. At $t_1$, CL changes from 1 to 0 and this has no effect on stage 12. At $t_2$ when CL again changes to 1, $\overline{A}$ has the value 0 so that A changes to 0 and $\overline{A}$ changes to 1. Thus, it is clear that stage 12 produces a square wave A whose frequency is one-half that of the clock pulses CL.

The stages 14 and 16 comprise a two-stage counter with feedback from the last stage to the first stage. If $\overline{G}$ initially is assumed to represent the value 1, at time $t_0$ stage 14 becomes set and B changes to 1. At time $t_4$ when the next 0 to 1 transition of A occurs, B=1 so that stage 16 becomes set and G changes to 1. This sequence of events continues for the four counts, 10 11 01 00 and then the count repeats. The frequency of the counter 14, 16 is one-quarter that of the flip-flop 12.

The NAND-gate 18 plus inverter 20 perform the logical function of an AND gate as do the combination of NAND-gate 22 with inverter 24. Thus, when both B and $\overline{G}$ represent 1, gate 18 produces an output representing a 0 and inverter 20 produces an output representing a 1. Stages 22, 24 operate in similar fashion. Thus, $\phi A=B\overline{G}$ and $\phi B=\overline{B}G$.

Assume that DF1, the output of the storage circuit 26, 27, 28, 29 (upper left of FIG. 2*a*) initially represents a 0. Assume also that the data bit H=1 from the delay line is directly applied to gate 26 and is applied via inverter 30 to gate 28. Assume also that SC3 represents a 1 at this time. The H=1 and SC3=1 inputs to gate 26 set the flip-flop 26–29 changing DF1 to 1 and $\overline{DF1}$ to 0. When $\overline{DF1}$ changes to 0, gate 32 produces an output E=1. Therefore, the first positive clock pulse which occurs after the start of the first data bit H causes stage 33 to store a 1. It may be observed from the drawing of waveforms FIG. 3 that H changes to 1 at time $t_3$; that DF1 changes to 1 at this same time $t_3$ and that E changes to 1 also at this same time $t_3$. The positive clock pulse starts at time $t_4$ so that SO changes to 1 at time $t_4$. When SO changes to 1, $\overline{SO}$ changes to 0 and as this is a feedback signal to gate 32, E retains the value 1 regardless of what happens to DF1 until SO is reset by the END-N pulse.

At time $t_6$, the positive clock pulse CL sets the flip-flop 35 as SO has the value 1. Therefore, at time $t_6$ S1 changes to 1. This S1=1 signal applied to the C-terminal of flip-flop 35 (upper right, FIG. 2*a*) causes this flip-flop to accept the signal produced by gate 34. At time $t_6$, $\overline{B}$=0 so that gate 34 is applying a signal F=1 to the D-terminal of flip-flop 35. Therefore, the signal S2 changes to 1 and the complementary signal $\overline{S2}$=0 fed back to gate 34 locks the flip-flop 35 in this state.

The signal S1 is also applied to gate 38. At this particular time $t_6$, CL has the value 1 so that gate 38 produces a relatively negative output J=0. One-half clock pulse later, CL changes to 0 and J changes to 1. Flip-flops 39 and 43 initially are set and flip-flop 41 initially is reset. Therefore, in their initial condition, these three stages are storing the number SC1, SC2, SC3=101. In response to the signal J=1, that is, at time $t_7$, SC1 changes to 0 and $\overline{SC1}$ changes to 1. The change of $\overline{SC1}$ from 0 to 1 sets flip-flop 41 as at this time $\overline{SC2}$=1. When flip-flop 41 becomes set, SC2 changes to 1 and $\overline{SC2}$ to 0. Thereafter, at time $t_9$, SC1 changes to 1. At time $t_{11}$, in response to the change of $\overline{SC2}$ from 0 to 1, SC3 changes from 1 to 0. The eight successive counts produced by the three-stage counter 39, 41, 43 starting from their initial count, are 101, 011, 111, 000, 100, 010, 110, 001, all can be derived from the waveforms of FIG. 3.

When H changes back to 0, the state of storage circuit 26–29 is not affected. However, at time $t_{19}$, when SC3 changes from 0 back to 1, both inputs to gate 28 are 1 so that this gate produces an output representing a 0. This causes gate 29 to produce an output representing a 1 that is, $\overline{DF1}$ changes to 1 and DF1 changes to 0. This change occurs slightly after $t_{19}$ in view of the gate delays at 28, 29, 30.

Immediately prior to the time that DF1 changes back to 0 the SC3=1 signal is applied to the C-terminal of flip-flop 45. This sets this flip-flop, that is, DF2 changes to 1. At time $t_{27}$, $\overline{SC3}$ changes to 1 and this causes the flip-flop 47 to store the DF2 signal. In other words, DF3 changes to 1.

The signal DF2 is applied to gate 40. However, when it changes to 1 this does not affect the gate since its other input $\overline{S2}$ has the value 0 at this time. At the time $t_{27}$ when DF3 changes to 1, the second input S2 to gate 42 also is 1. Therefore, this gate produces a O-output and the following gate 44 produces a K=1 output. This K-output serves as an input to the D-terminal of the first stage 46 (FIG. 2*b*) of the buffer register 60. At time $t_{32}$, the shift pulse $\phi$A changes to 1 so that the K=1 signal is gated into stage 46. Therefore, the output $\overline{L}$ of this register changes to 0. This output is applied to gate 47 causing the gate to apply a 1 to the D-terminal of flip-flop 49. Accordingly, at time $t_{42}$, when the next shift pulse $\phi$A occurs, S3 changes to 1 and $\overline{S3}$ locks the flip-flop in this state.

The gate 48 at the output of flip-flop 49 receives as inputs $\overline{S4}$, S3 and $\phi$A–P. The four state counter 61–64 initially is reset so that the O-output of the first counter stage 61 is $\overline{MCO}$=1. The flip-flop 66–68 initially is reset by END-N so that $\overline{S4}$=1. S3=1 and remains 1. Therefore, each time $\phi$A–P terminates, that is each time $\phi$A–P changes from 1 to 0, starting at time $t_{49}$, the count stored in counter 61–64 advances by 1. This counter, in other words, keeps track of the stage in the buffer register 60, in which the first bit H is stored.

The process described above continues for each succeeding bit H received from the delay line. Each such bit is synchronized with the clock pulse $\phi$A–P in the manner described above and shifted into the buffer register 60. As each bit is shifted into the first stage of the register, the remaining bits in the register are all shifted one stage forward. Each time a new bit is shifted into the register, the four-stage counter 61–64 advances its count by 1.

The buffer register, which in this example is 16 stages long, is connected to two eight-input digital multiplexers 70 and 72. The function of each multiplexer is to connect a particular one of its eight-input lines to its output terminal $\overline{f}$, if the multiplexer is in its enabled condition. In response to the first eight counts of counter 61–64, INH=0 and $\overline{INH}$=1 (where INH is the most significant bit). The INH=0 signal enables multiplexer 70 and the $\overline{INH}$=1 signal disables the multiplexer 72. For the remaining eight counts, INH=1 disabling multiplexer 70 and $\overline{INH}$=0 enabling multiplexer 72.

Assume for purposes of the present discussion, that the SYNC-P pulse changes to 1 after the first bit is stored in the tenth stage 74 of the buffer register. This synchronization pulse, for example, may occur at the end of the vertical retrace period (see FIG. 4), that is, it may occur coincidentally with the start of the first horizontal television scan line presented on the screen of the television kinescope. This synchronization pulse is applied to gate 76 (center of FIG. 2*a*), and it is of sufficient duration that is, is still present when the next $\phi$B–P pulse occurs. These two signals enable gate 76 and it applies a relatively negative set pulse to flip-flop 66, 68 causing S4 to change to 1 and $\overline{S4}$ to change to 0.

The change of $\overline{S4}$ to 0 has no effect on the count stored in the counter 61–64 because when $\overline{S4}$ changes to 0, $\phi$A–P is already 0 and the output of gate 48 already is Q=1. So long as $\overline{S4}$ remains 0 (and it does remain 0 till the next END-N pulse occurs (see FIG. 4) the count in the counter 61–64 is "frozen," it cannot advance. If, for example, the counter is causing the tenth stage 74 to be connected to the $\overline{f}$ terminal of multiplexer 72, it remains so connected until the last bit stored in the delay line passes terminal $\overline{f}$ and the END-N pulse following this bit occurs. The $\phi$A–P pulses continue to be applied to gate 48 but they have no effect so long as $\overline{S4}$ remains 0.

The S4=1 signal is applied to gate 78 and serves as a priming signal for this gate. This essentially closes the feedback loop to the delay line 86.

The next $\phi$A–P pulse which occurs performs a number of functions. First, it gates into flip-flop 82 the start bit stored in the tenth stage 74. This bit is applied as the signal $\overline{f}$ through gate 80 and gate 78 to the D-terminal of flip-flop 82 and is waiting at that terminal when the leading edge (the 0 to 1 transition) of $\phi$A–P occurs. The signal gated into flip-flop 82 serves as an input DO-P to the register 84 and is subsequently shifted through this register to the delay line 86.

The same $\phi$A–P pulse which shifts the start bit into flip-flop 82 also shifts the start bit to the next stage 75, the second bit to stage 74 and so on. Therefore, the next $\phi$A–P pulse causes this second bit to be accepted by stage 82 and applied as the next DO-P signal to the memory and so on. This process continues until the last data bit passes from the stage 74 of the register back into the data register via flip-flop 82. It is clear that all of these bits are synchronized with $\phi$A–P and it is also clear that the first bit is supplied back to the delay line memory at exactly the right time, that is, in synchronism with the SYNC-P pulse.

After the last bit of data is written back into the delay line memory, the END-N pulse is produced. This pulse performs a number of functions. First, it serves as a reset signal for the counter 61–64 and for the flip-flop 66–68. The counter 61–64 is reset to its initial count of 000. The flip-flop 66–68 is reset, that is, S4 is changed to 0 and $\overline{S4}$ is changed to 1. The END-N pulse also resets flip-flop 49 changing S3 to 0 and $\overline{S3}$ to 1. The END-N pulse also resets the two flip-flops 33 and 35 (FIG. 2*a*, upper left), and the S1=0 output produced by flip-flop 35 disables gate 38. In other words, J, the output of gate 38, continuously retains the value 1. The S1=0 signal serves as a set signal for flip-flops 39 and 43 and as a reset signal for flip-flop 41. Thus, this three stage counter is placed back in its initial condition storing a count of 101. As H=0 and SC3=1, gate 28 becomes enabled and DF1 changes to 0. Thus, the END-N pulse returns the circuit to its initial condition waiting for the arrival of the first information pulse H.

Figure 4:
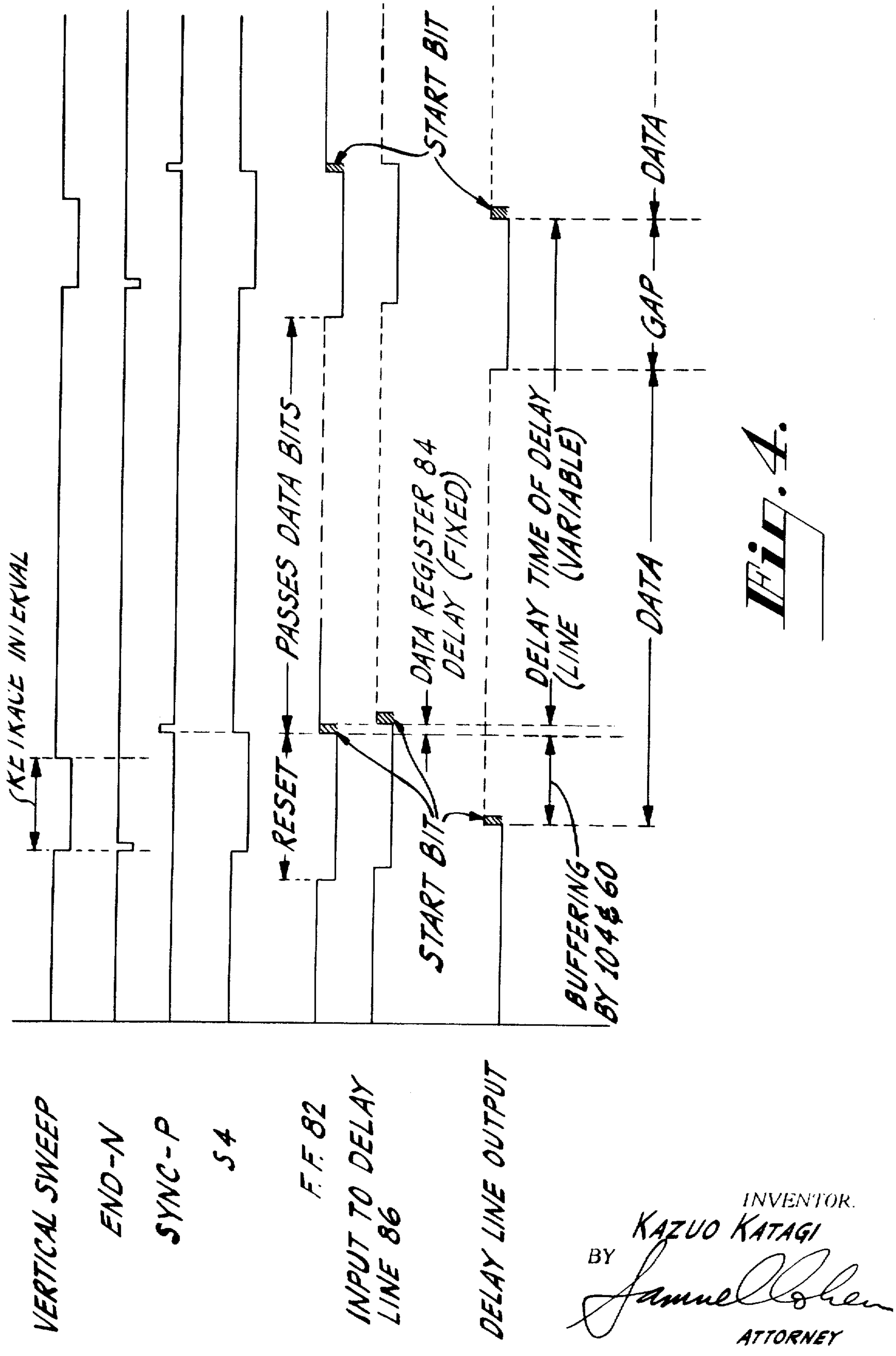

The various control pulses discussed above are produced in the timing generator 90. This circuit is conventional and may include a bit counter, word counter and the other circuits needed in a particular system for processing data, in addition to the circuits for producing the SYNC-P and END-N signals. In the present application the END-N and SYNC-P pulses are generated at the beginning and end of the vertical retrace interval, as already indicated. FIG. 4 shows in a somewhat longer time scale, the time relationship among various of these pulses. A more detailed discussion of circuits such as those of block 90 may be found in Hutchinson et al., U.S. Pat. No. 3,432,816, issued Mar. 11, 1969.

The switch 45 (FIG. 2*a*, right center) is not needed where the bit-shifting rate is relatively low and there is no phase ambiguity between the DF2 signal and the leading edge of the shift pulse $\phi$A–P applied to register 60. However, for a 1 megahertz or higher bit rate and relatively fast (50 nanosecond) gates, the switch is helpful to permit the selection of DF2 directly as the input K to the register 60.

While the invention has been illustrated in terms of a single delay line memory, the principles are applicable to the synchronization of a number of memories in parallel. In a system employing a number of arrangements such as shown in FIG. 2, each serial data stream is originally clocked by a master clock and passes through variable delay means such as serial storage means as illustrated or such as long transmission lines. The maximum amount of "skew" which can be corrected in a system of this type is determined by the length of the respective shift registers. One of the date streams may be designated as the reference data stream or the data stream which arrives first may be chosen as the reference data stream. In the first case, the synchronizing pulse is generated when the start pulse arrives at the midpoint of the designated shift register; in the second case the synchronizing pulse should be generated when the earliest start pulse reaches the last stages of its shift register for the most efficient buffering.

What is claimed is:

1. In combination:

serial memory means including an input circuit and an output circuit and introducing a delay which nominally is T—$\Delta t$, where $\Delta t$ may vary;

means for applying to said input circuit, for storage in said memory means, sequential signals comprising a start signal followed by other signals;

an adjustable delay circuit connecting said output circuit to said input circuit for applying the bits stored in said memory means back to said memory means as they emerge therefrom;

means for producing synchronization signals at intervals T; and means responsive to the difference in time between the presence of a start signal at said output circuit of said serial memory means and the occurrence of a synchronization signal for adjusting the delay introduced by said delay circuit to a value $\Delta t$, whereby the actual delay introduced by said memory means plus the delay introduced by said delay circuit is equal to T.

2. In the combination as set forth in claim 1, said delay circuit comprising a shift register having a plurality of stages and including an input terminal at the first of said stages and a plurality of output terminals one at each said stage, and said means for adjusting the delay comprising means for selecting a particular one of said output terminals for connection back to said input circuit.

3. The combination as set forth in claim 2 further including:

a source of shift pulses coupled to said register for shifting said start signal and the signals following said start signal into said register;

a counter responsive to said shift pulses for producing a count indicative of the stage in said register containing said start signal; and said means responsive to said synchronization signal, including means for connecting the output terminal of the stage in said shift register indicated by said counter to be storing said start signal at the time a synchronization signal occurs, back to said input circuit.

4. A circuit for adjusting the total delay introduced by a delay line memory and the feedback loop between the output circuit and input circuit of said memory to the time interval between two synchronization signals comprising, in combination:

a shift register in said feedback loop including an input terminal for receiving the signals from the output circuit of the delay line and a plurality of output terminals, one at each stage of said register;

a source of shift pulses coupled to said register for shifting the signals through said register;

means responsive to a first synchronization signal for connecting one output terminal of said shift register back to said input circuit and for applying a first signal and the sequential signals following said first signal shifted into said register back to said delay line memory input circuit;

means for disconnecting said output terminal from said input circuit after the last stored signal has left said shift register;

a counter;

means responsive to the reappearance of said start signal at said shift register and to said shift pulses for causing the counter to start and to produce a count, as said start signal is shifted through said register, indicative of the stage in said register storing said start signal; and means responsive to the next synchronization signal and to said counter for stopping said counter and for connecting the output terminal at the stage of said shift register storing said start signal, back to said input circuit of said delay line memory.

5. In combination:

a serial transmission medium which introduces a delay which nominally is T—$\Delta t$, where $\Delta t$ may vary;

means for applying to said medium for transmission thereby sequential signals comprising a start signal followed by other signals;

a shift register having a plurality of stages and including an input terminal at the first of said stages coupled to said transmission medium and receptive of said sequential signals from said medium, and a plurality of output terminals, one at each said stage;

means for applying successive shift pulses to said register for shifting the signals received by said register from stage to stage;

means for producing a synchronization signal at an interval T after the start bit is applied to the serial transmission medium;

a signal-receiving circuit; and means responsive to the difference between the time the start signal is applied to the input terminal of the first stage of said shift register and the time of occurrence of said synchronization signal for connecting to said signal-receiving circuit the output terminal of said shift register of the stage which, at the time of occurrence of said synchronization signal, is storing said start signal.

6. The combination as set forth in claim 5, further including a counter responsive to said shift pulses for producing a count indicative of the stage in said register storing said start signal and wherein said means responsive to said synchronization signals connects the stage corresponding to the count indicated by said counter to said signal-receiving circuit.

7. In combination:

a serial storage medium;

means for applying a start bit followed by a serial bit train to said storage medium;

means for keeping track of the position in said storage medium of the start bit;

a timing signal source; and means responsive to a signal from said timing signal source and to said means for keeping track of the position of said start bit for extracting said serial bit train from the point along said storage medium at which the start bit is located at the time said timing signal occurs.

* * * * *